United States Patent [19]
Ishizuka

[11] Patent Number: 5,262,873
[45] Date of Patent: Nov. 16, 1993

[54] IMAGE SIGNAL CORRECTING IN IMAGE DATA PROCESSING REQUIRING ONLY SMALL MEMORY CAPACITY

[75] Inventor: Keiji Ishizuka, Kawasaki, Japan

[73] Assignee: Canon Kabushiki Kaisha, Tokyo, Japan

[21] Appl. No.: 788,458

[22] Filed: Nov. 5, 1991

[30] Foreign Application Priority Data

Nov. 7, 1990 [JP] Japan .................. 2-299879
Nov. 7, 1990 [JP] Japan .................. 2-299880

[51] Int. Cl.⁵ .................................. H04N 1/40
[52] U.S. Cl. .................................. 358/443; 358/444; 358/445; 358/463; 358/466; 341/163
[58] Field of Search .............. 358/296, 167, 463, 426, 358/445, 404, 444, 443, 466, 465; 341/163, 158

[56] References Cited

U.S. PATENT DOCUMENTS

| 4,459,488 | 7/1984 | Uzawa et al. . |
| 4,461,956 | 7/1984 | Hatanaka et al. . |
| 4,479,149 | 10/1984 | Yoshioka et al. . |
| 4,499,547 | 2/1985 | Inuiya et al. . |
| 4,634,886 | 1/1987 | Hatanaka et al. . |
| 4,680,644 | 7/1987 | Shirato et al. . |
| 4,723,129 | 1/1988 | Endo et al. . |
| 4,723,166 | 2/1988 | Stratton ........................ 358/167 |
| 4,731,665 | 3/1988 | Hashimoto et al. . |
| 4,740,796 | 4/1988 | Endo et al. . |
| 4,745,488 | 5/1988 | Kaifu et al. . |
| 4,768,085 | 8/1988 | Hashimoto . |
| 4,779,137 | 10/1988 | Tojo et al. . |
| 4,791,469 | 12/1988 | Ohmi et al. . |
| 4,810,896 | 3/1989 | Tanaka et al. . |
| 5,018,198 | 5/1991 | Takahashi . |
| 5,027,117 | 6/1991 | Yoshida et al. ............ 341/158 |

FOREIGN PATENT DOCUMENTS 251740 1/1988 European Pat. Off. .

*Primary Examiner*—Edward L. Coles, Sr.
*Assistant Examiner*—Scott A. Rogers
*Attorney, Agent, or Firm*—Fitzpatrick, Cella, Harper & Scinto

[57] ABSTRACT

An image signal correcting circuit device includes an A/D conversion unit for converting an analog image signal output from an image reading unit into a digital signal, a storage unit for storing correction data, and a correction unit for performing correction on a signal based on the correction data stored in the storage unit. The correction data stored in the storage unit is difference data between at least two pixel signals in the digital signal which is generated by a correction data generating unit. Alternatively, the correction data stored in the storage unit is obtained by amplifying an analog reference signal by an amplification factor of m (m>1) and by converting the amplified analog signal into a digital correction signal by the A/D conversion unit.

8 Claims, 9 Drawing Sheets

IMAGE SIGNAL CORRECTING IN IMAGE DATA PROCESSING REQUIRING ONLY SMALL MEMORY CAPACITY

BACKGROUND OF THE INVENTION

1. Field of the Invention

The present invention relates to an image signal correcting circuit device for use in an image data processing apparatus, such as a copying machine, a facsimile machine or a video tape recorder, for correcting image signals.

2. Related Background Art

In order to faithfully reproduce original images, such as original documents for a facsimile machine or subjects for a video tape recorder, various types of data processing apparatuses are each provided with a correcting circuit device.

FIG. 1 shows a conventional correcting circuit device. This correcting device is designed to correct a white image signal, e.g., to compensate for shading. In this device, correction is made by multiplying an output of an A/D converter 1 by a correction factor previously stored in a ROM 3 by means of a multiplier 2.

Dark signals, such as fixed pattern noises, are corrected by a correcting circuit device other than the aforementioned one.

FIG. 2 shows such a conventional correcting circuit device of another type. In this correcting circuit device, a dark signal of an image sensor measured by a black box or the like is written in a ROM 13 previously. A dark signal in the output of the sensor is compensated for by subtracting the dark signal stored in the ROM 13 from the image signal obtained by an A/D converter 1 by means of a subtracter 4.

However, in the aforementioned conventional correcting devices, the ROM 3 or 13 must have a large capacity which allows for storage of white or dark correction data, and the size of the overall system is thus increased.

In the conventional correcting device shown in FIG. 1, when it is desired to make all of the bits of the data from the A/D converter 1 effective, both the multiplier and the multiplicand combined in the multiplier 2 must have a number of bits larger than that of the output of the A/D converter 1. Also, the capacity of the ROM 3 is increased. Consequently, the size of the overall system is increased, and high-speed operation of the system is made difficult.

In the conventional correcting device shown in FIG. 2, when it is desired to output 6-bit data, at least 8-bit data is required from both the A/D converter and the ROM 13. Consequently, conversion accuracy and operation speed of the A/D converter 1 deteriorate and the capacity of the ROM 13 is increased.

Furthermore, the correction data previously measured by the black box of the like may not always correspond to the dark signal obtained in an actual operation, and correction accuracy thus deteriorates.

SUMMARY OF THE INVENTION

A primary object of the present invention is to provide a small image signal correcting circuit device which enables a simple system to be constructed.

A second object of the present invention is to provide an image signal correcting circuit device which is capable of correcting white image signals with a high speed and at a high degree of accuracy.

A third object of the present invention is to provide an image signal correcting circuit device which is capable of correcting dark signals at a high degree of accuracy, and which allows for an easy and economic system design or integration of a system.

To achieve the aforementioned objects, the present invention provides an image signal correcting circuit device which includes an A/D conversion means for converting an analog image signal output from an image reading means into a digital signal, a storage means for storing correction data, and a correction means for performing correction on a signal based on the correction data stored in the storage means. The image signal correcting circuit device includes a correction data generation means for generating differential data between at least two pixel signals in the digital signal. The differential data is stored in the storage means as the correction data.

The present invention further provides an image signal correcting circuit device including an A/D conversion means for converting an analog image signal output from an image reading means into a digital signal, a storage means for storing correction data, and a correction means for performing correction on a signal using the correction data stored in the storage means. The image signal correcting circuit device includes an amplification means for amplifying an analog reference signal by an amplification factor of m (m>1). The amplified analog signal is converted into a digital correction signal by the A/D conversion means, and the digital correction signal is stored in the storage means as the correction data.

The present invention further provides an image signal correcting circuit device which includes an A/D conversion means for converting an analog image signal output from an image reading means into a digital signal, a storage means for storing correction data, and a correction means for performing correction on a signal using based on the correction data stored in the storage means. The correction means includes a first correcting circuit for performing correction using first correction data, and a second correcting circuit for performing correction using second correction data. The first correcting circuit includes a correction data generating circuit for generating as the first correction data differential data between at least two pixel signals in a digital reference signal and for storing the generated differential data in the storage means. The second correcting circuit includes a circuit for amplifying an analog reference signal by an amplification factor of m (m>1), for converting the amplified analog signal into a digital correction signal by means of the A/D conversion means, and for storing the digital correction signal in the storage means as the second correction data.

DETAILED DESCRIPTION OF THE PREFERRED EMBODIMENTS

First Embodiment

A first embodiment of the present invention will be described first with reference to FIG. 3.

The first embodiment is preferably used as a circuit for correcting a white image signal.

This embodiment is based on the discovery that shading between adjacent pixels of an image sensor is relatively small, and is directed to compression of correction data which is achieved by storing only a difference between the adjacent pixels in a correction data storage means.

Figure 1:
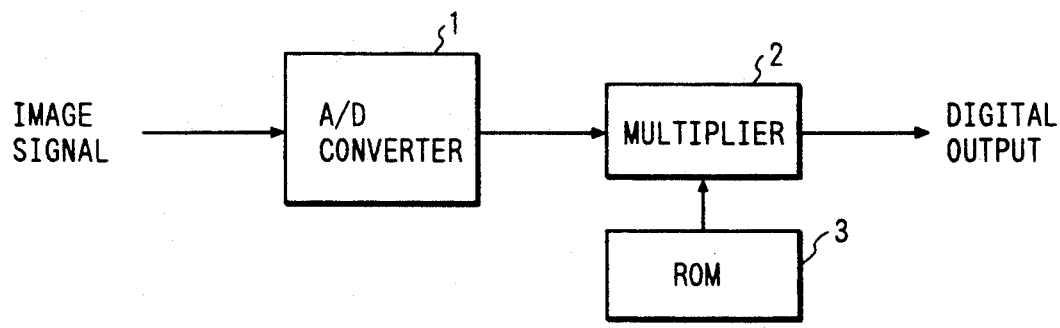
FIG. 1 is a block diagram of a conventional device for correcting a white image signal.
Figure 2:
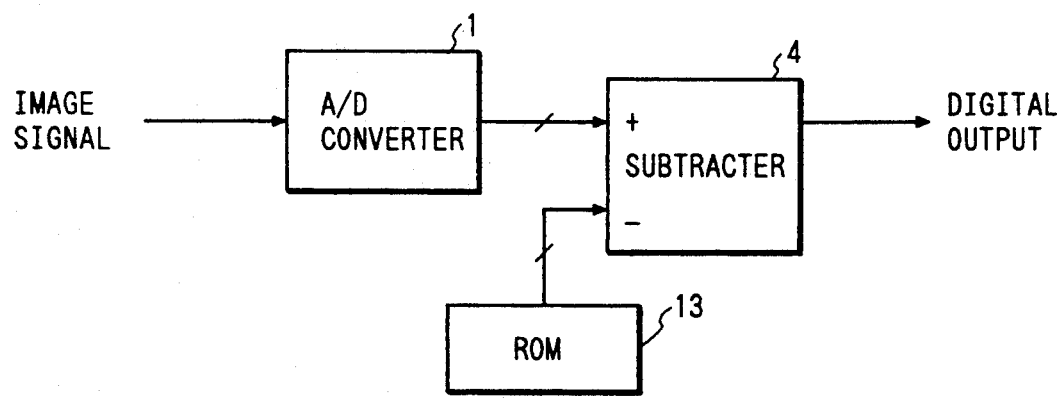
FIG. 2 is a block diagram of a conventional device for correcting a dark image signal.
Figure 3:
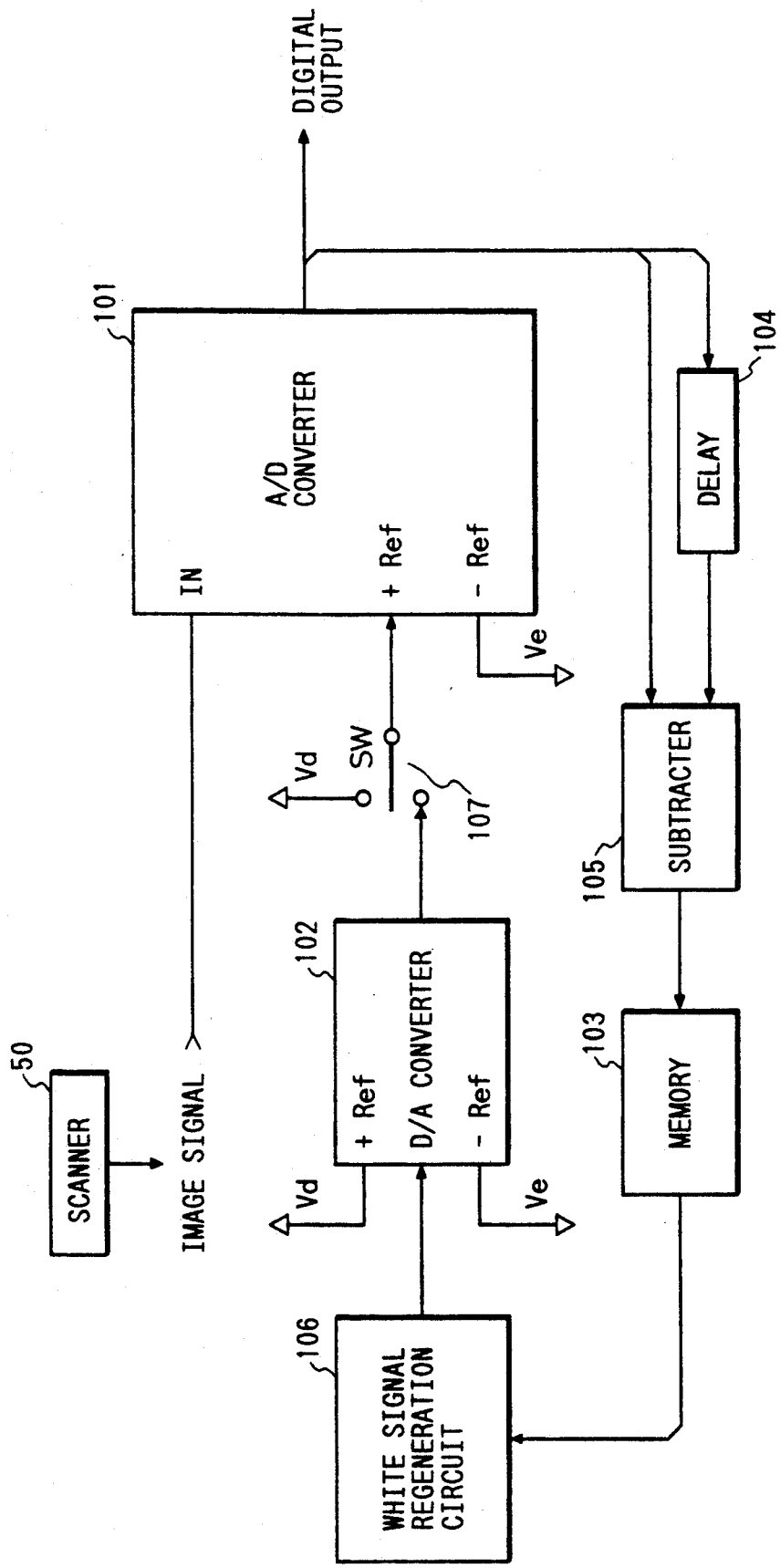
FIG. 3 is a block diagram of a first embodiment of the correcting device according to the present invention.

FIG. 3 is a block diagram of the first embodiment of the present invention. An original to be transmitted from a facsimile is read by, for example, a scanner 50 having an image sensor. An A/D converter 101, which is a conversion means, converts the image signal from the scanner 50 into a digital image signal. Reference voltages Vd and Ve for determining the quantizing range are applied to +Ref and −Ref terminals of the A/D converter 101. Also, when an analog signal is input to the A/D converter 101 from a D/A converter 102, the signal level at +Ref terminal of the A/D converter 101 changes in response to the white signal correction level, and a corrected white image signal is thus output from the A/D converter 101. A delay circuit 104, serving as a delay circuit, delays the digital image signal from the A/D converter 101 by a time corresponding to at least a single pixel of the scanner. A subtracter 105, serving as a subtraction means, calculates a difference between the digital image signal from the A/D converter 101 and the image signal from the delay circuit 104. The difference obtained by the delay circuit 104 and the subtracter 105, which in combination form a correction data generation means, is stored as correction data in a memory 103 serving as the storage means. A white signal regenerating circuit 106, including an addition means and constituting a correction means, regenerates an original signal from which the difference is obtained. A D/A converter 102, constituting a correction means, converts the digital signal from the white signal regenerating circuit 106 into an analog signal. A switch 107 is changed over between a reference power source (reference voltage Vd) and the D/A converter 102.

In the correcting device arranged in the manner mentioned above, a light from a light source is reflected by a white reference provided in the scanner, and the reflected light is made incident on each of the pixels of the scanner. The output of each of the pixels is quantized to obtain data required to generate a white correction factor.

The image signal output from the scanner when it reads the white reference is input to the A/D converter 101 and is thereby converted into a digital signal. At that time, the switch 107 is connected to the reference power source (reference voltage Vd) so that the pixel signal can be quantized in a voltage range between the reference voltages Vd and Ve. The delay circuit 104 delays the digital image signal from the A/D converter 101 by, for example, one pixel. The subtracter 105 produces a difference between the pixel signal currently output from the A/D converter 101 and the pixel signal output from the A/D converter 101 one pixel before. Hence, the output of the subtracter 105 may be an offset binary code having either a positive or negative sign. This output of the subtracter 105 is stored in the memory 103 for each pixel of a single line of the scanner.

When an actual reading operation begins (for example, when an original is transmitted by a facsimile), the differential data is read out from the memory 103 to the white signal regenerating circuit 106, and addition of the differential data is performed by the white signal regenerating circuit 106 to regenerate the original signal from which the difference is obtained. Hence, before subtraction and addition are initiated in the subtracter 105 and the white signal regenerating circuit 106, the reference for both subtraction and addition must be made equal, because the original signal from which the difference is obtained can be regenerated by conducting subtraction and addition using this same reference. The digital signal regenerated by the white signal regenerating circuit 106 is converted into an analog signal by the D/A converter 102. At that time, since the switch 107 is connected to the D/A converter 102, the signal from the D/A converter 102 is input to +Ref terminal of the A/D converter 101. Because the signal level at +Ref terminal varies in accordance with the white signal correction level, the A/D converter 101 outputs a digital signal on which white correction has been made.

Since the scanner is generally characterized by the white signals between adjacent pixels or within a range of a small number of pixels being similar to each other, the difference between the adjacent pixels is, for example, between 1 and several tens of percentage points of the full scale. Therefore, the value representing the difference is small with respect to the number of bits of the output of the A/D converter 101, and the number of bits required for the memory 103 can thus be reduced, saving the capacity of the memory 103.

Furthermore, the regenerated white signal correction factor is converted into an analog signal by the A/D converter, and the resultant signal is input to +Ref terminal of the A/D converter. Therefore, digital correction is not made, and the size of the hardware can be reduced.

Furthermore, in this embodiment, since the correction factor is not stored in the ROM, unlike the case of a conventional correcting device, it can be changed with time.

Second Embodiment

In the first embodiment, white signal correction may not be performed correctly in the following case. Assuming that the resolution of the A/D converter 101 shown in FIG. 3 is 6 bits, if the output of the A/D converter 101 is expressed in decimal notation, it is quantized in 64 stages between 0 and 63. Hence, if the output of the delay circuit 104 is "50" and if the output of the A/D converter 101 is "55", the output of the subtracter 105 is "+5". If the output of the delay circuit 104 is "50" and if the output of the A/D converter 101 is "45", the output of the subtracter 105 is "−5" (the sign of the results of the operation is reversed when the output of the A/D converter 105 is subtracted from the output of the delay circuit 104). If the number of bits of the output of the subtracter 105 is 4 bits, the output of the subtracter 105 is, for example, between −8 and +7. This means that when the results of the subtraction exceed the range between −8 and +7, white signal correction cannot be performed correctly.

Accordingly, in the second embodiment, the range in which the results of the operation can be obtained is at least doubled by reducing the accuracy of the subtracter 105 by one half or more.

That is, in the second embodiment, either of the following two alternatives is adopted.

(1) The output of the A/D converter 101 other than one to a few bits of the minimum resolution (LSB) side of the output of the A/D converter 101 is input to the subtracter 105, and the result of the subtraction is stored in the memory 103.

(2) All the bits of the output of the A/D converter 101 are input to the subtracter 105. However, the bits of the results of the subtraction other than 1 to a few bits of the LSB side are stored in the memory 103.

In either of the methods (1) and (2), the white signal regenerating circuit 106 must regenerate the original signal in accordance with the results of the selected operation.

Third Embodiment

Figure 4:
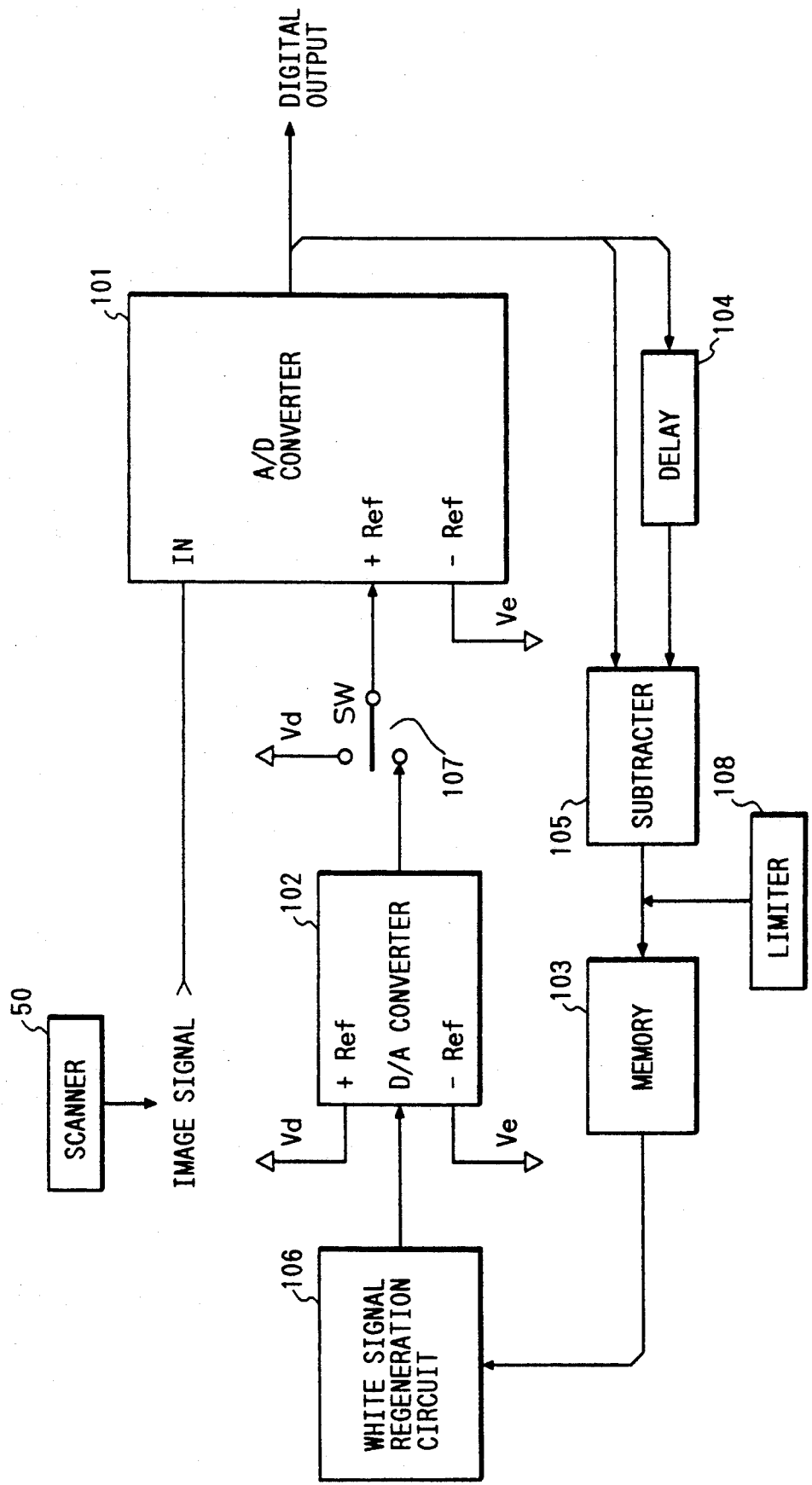
FIG. 4 is a block diagram of a third embodiment of the correcting device according to the present invention.

In the first embodiment, when the results of the subtraction by the subtracter 105 exceed the range in which they can be expressed by the output of the subtracter 105, an operation error may be generated, and a correct white correction signal may not be regenerated. Accordingly, in the third embodiment, a limitation means 108 is provided to limit the results of the operation by the subtracter 105 such that they do not exceed the maximum and minimum values of the range in which the results of the operation can be expressed by the output of the subtracter 105, as shown in FIG. 4.

Fourth Embodiment

Figure 5:
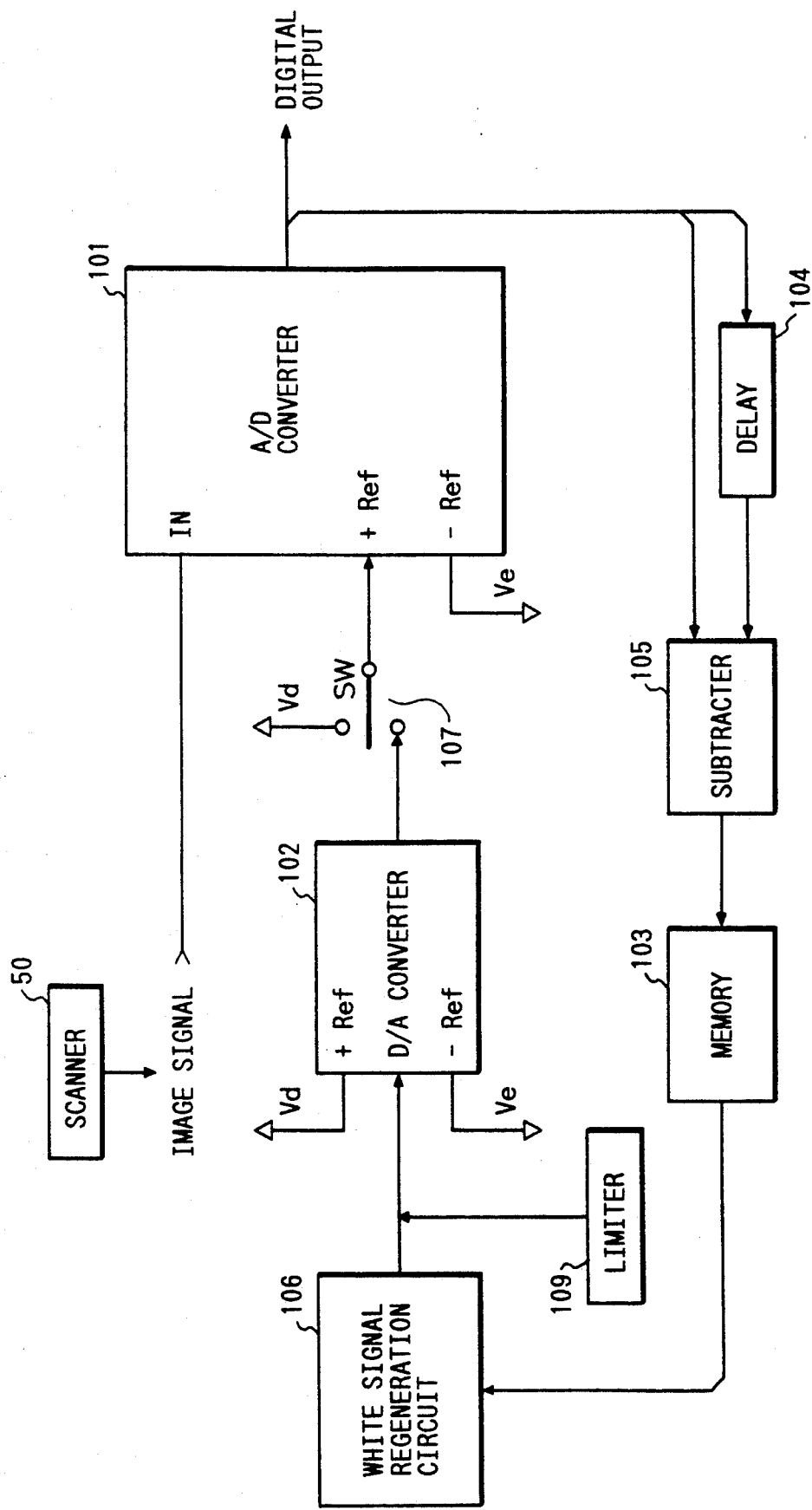
FIG. 5 is a block diagram of a fourth embodiment of the correcting device according to the present invention.

If the resolution of the output of the A/D converter 101 shown in FIG. 3 is 6 bits, the output of the white signal regenerating circuit 106 is, for example, a value from 0 to 63. As in the case of the third embodiment, when the results of the white signal regenerating circuit 106 exceed the range in which they can be expressed by the output of the white signal regenerating circuit 106, an operation error may be generated, and proper correction may not be performed. Accordingly, in the fourth embodiment, the white signal regenerating circuit 106 is provided with a limitation means 109 for limiting the output of the white signal regenerating circuit 106 such that it does not exceed the aforementioned range, as shown in FIG. 5.

Fifth Embodiment

Figure 6:
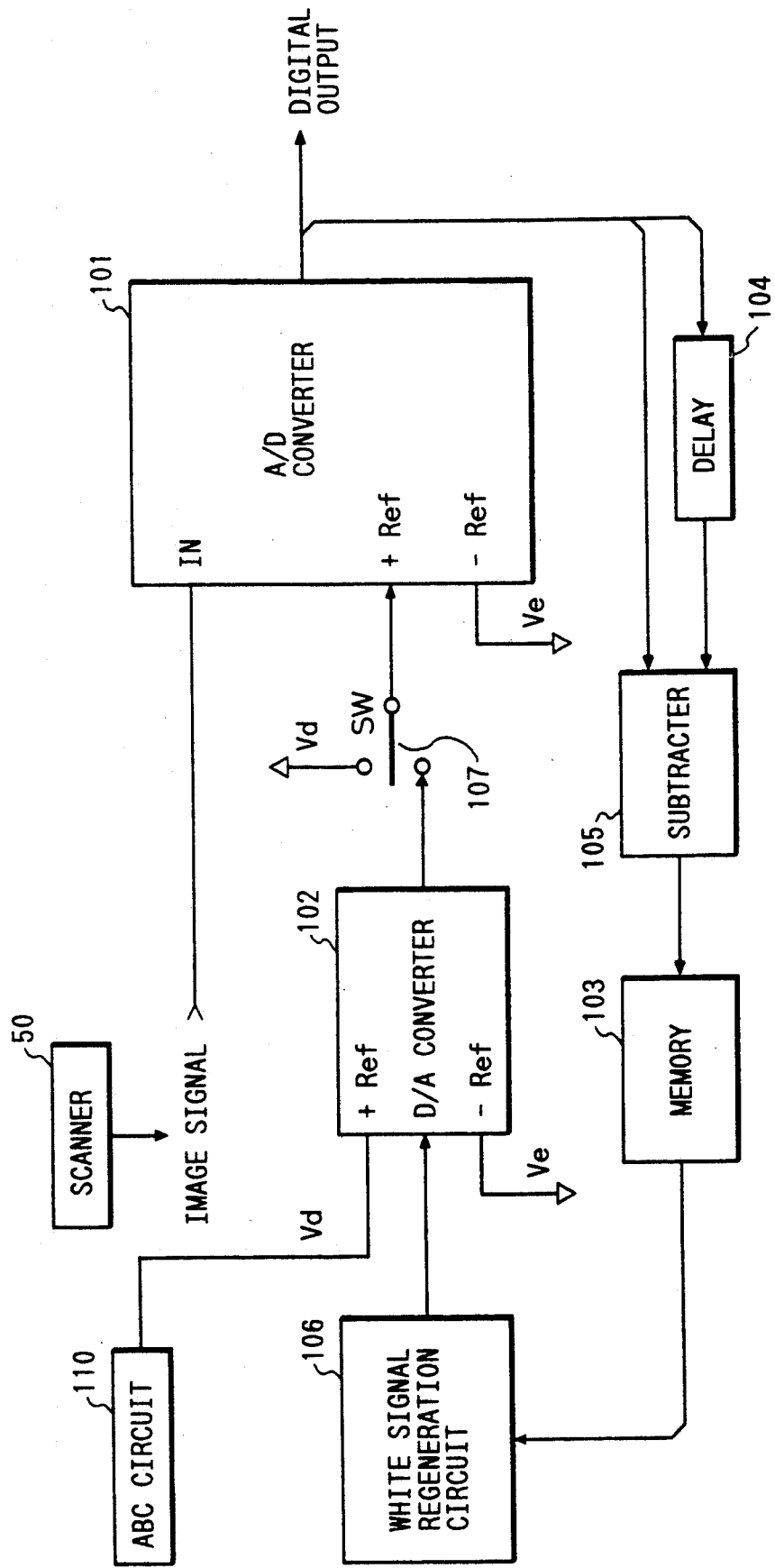
FIG. 6 is a block diagram of a fifth embodiment of the correcting device according to the present invention.

In the first through fourth embodiments, when the correction factor is generated, a white reference is read by the scanner, and quantization is made within the range of the voltages applied to +Ref and −Ref terminals of the A/D converter 1. In the fifth embodiment, the peak of individual images is maintained constant by an automatic background control (ABC) circuit 110, as shown in FIG. 6. More specifically, the +Ref terminal of the D/A converter 102 is connected to the output of the ABC circuit 110 so as to obtain the results of the A/D conversion which follow the peak of the image. In this way, even when the scanner reads an object having a lower reflectivity than the white reference, blackening of the entire image can be prevented.

The image signal correcting devices according to the first through fifth embodiments can be formed on a single chip as a semiconductor integrated circuit.

Sixth Embodiment

Next, a sixth embodiment of the present invention will be described below. The sixth embodiment is desirably used to correct the dark signal.

In the A/D converter, to obtain an output of a predetermined number of bits, correction data must be processed in a number of bits larger than the predetermined number, because correction errors may be generated due to quantizing errors, linear distortion or other offsets which are peculiar to the A/D converter. Accordingly, the correction data is generated by amplifying the signal to be A/D converted by means of an amplification means and then by A/D convert the amplified signal.

Figure 7:
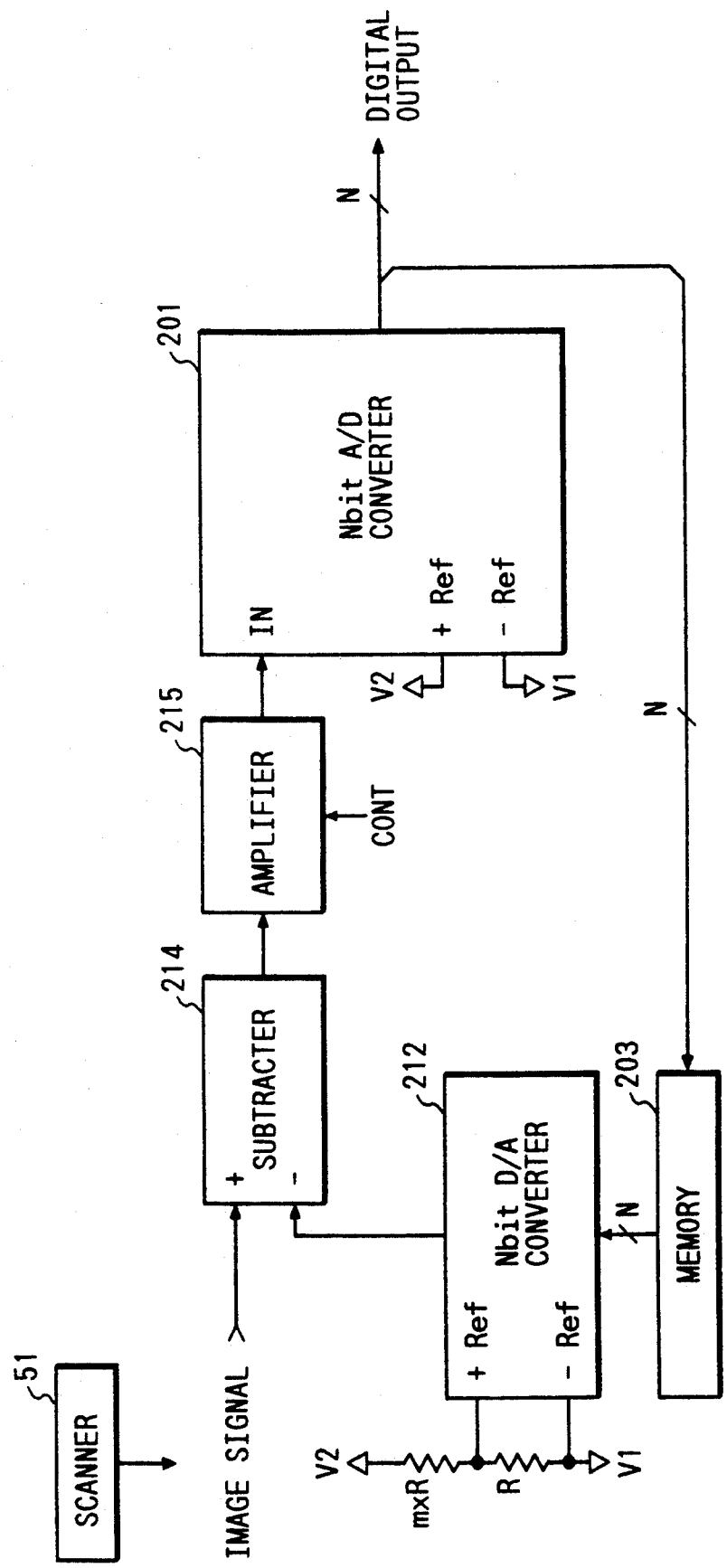
FIG. 7 is a block diagram of a sixth embodiment of the correcting device according to the present invention.

FIG. 7 is a block diagram of the sixth embodiment of the present invention. The amplification factor of an amplifier 215, serving as an amplification means, is set to "m" by a control signal CONT when dark signal correction data is generated, so that a dark signal in the image signal from a scanner 51 having an image sensor, serving as the image reading means, can be amplified by an amplification factor of m. The normal amplification factor of the amplifier 215 is "1". An N-bit A/D converter 201, serving as an A/D conversion means, converts the analog dark signal amplified by the amplification factor of m by the amplifier 215 into a digital dark signal. A memory, serving as a storage means, stores a digital dark signal converted by the A/D converter 201. An N-bit D/A converter 212, serving as a D/A conversion means, decreases the digital dark signal output from the memory 203 by m, and converts the digital signal into an analog signal. A subtracter 214, serving as a subtraction means, subtracts the analog dark signal output from the D/A converter 212 from the image signal output from the scanner. An analog reference voltage V1 determines the minimum value of the digital output of the A/D converter 201. An analog reference voltage V2 determines the maximum value of the digital output of the A/D converter 201.

In the correcting device arranged in the manner mentioned above, a dark signal can be obtained for each of the bits of the scanner by reading a black reference by a scanner or by turning off a light source and then by performing reading by the scanner under the darkest condition. Before the dark signal is stored in the memory 203 for each bit of the scanner, the following setting is performed.

The analog reference voltage V1 determines the minimum value of the digital output of the A/D converter 201, while the analog reference voltage V2 determines the maximum value of the digital output of the A/D converter 201.

When a dark signal correction data is stored in the memory 203, the D/A converter 212 is set such that it outputs a fixed value of V1. The subtracter 214 outputs the same signal as the image signal, i.e., as the dark signal. The amplification factor of the amplifier 215 is set to m by control signal CONT. If the dark signal is $V_N$, the amplifier 215 outputs a signal of $m \times V_N$. The output of the amplifier 215 is converted into a digital value of $m \times V_N$ by the A/D converter 201. This value is stored in the memory 203.

When reading by the scanner is performed, an image signal containing a dark signal is input from the scanner. An input image signal $V_{in}$ is expressed by $V_{in} = V_S + V_N$, where $V_S$ is the effective signal. The dark signal correction data is read out from the memory 203 and the data is then input to the D/A converter 212. Since a value expressed by $(V_2 - V_1) \times 1/m$ is applied to +Ref terminal of the D/A converter 212, a value $V_N = m \times V_N \times 1/m$ is output to the minus terminal of the subtracter 204. In an actual reading by the scanner, the subtracter 214 outputs a value $V_S$. Since the amplification factor of the amplifier 215 is set to "1" by control signal CONT, the output of the amplifier 215 is $V_S$. $V_S$ is converted into a digital value by the A/D converter 201 to obtain a digital output which is free of dark shading.

When correction is made digitally in a conventional correcting device including an N-bit A/D converter, a N/4-bit image signal is actually output from the A/D converter due to quantizing errors generated when the correction data is generated or due to shifting failures.

In a system which requires, for example, a 6-bit image signal, an 8-bit A/D converter and a 8-bit digital subtracter are therefore necessary, and an economic and integrated system cannot be obtained.

In this embodiment, since the amplification factor of the amplifier 215 is set to, for example, 4 only when the dark signal correction data is stored, correction data which is as accurate as 8-bit data can be obtained from a 6-bit A/D converter. In an actual operation, the correction data is decreased by a factor of 4 and converted into an analog signal by the D/A converter 212 so as to achieve accurate compensation for the dark shading.

Hence, an 8-bit D/A converter 212 is required in this embodiment. However, the chip area of the aforementioned correcting device can be decreased, and quantizing accuracy of A/D or D/A conversion can be improved.

Furthermore, since the dark signal correction data of the scanner is generated in an actual environment, it changes with time and is useful as compared with the ROM method.

Furthermore, since the dark signal has a number of bits smaller than that of the effective signal, the number of bits of the quantized value of the dark signal is less than N. Since a value having a number of bits smaller than N is stored in the memory 203, the capacity of the memory can be saved.

Seventh Embodiment

Figure 8:
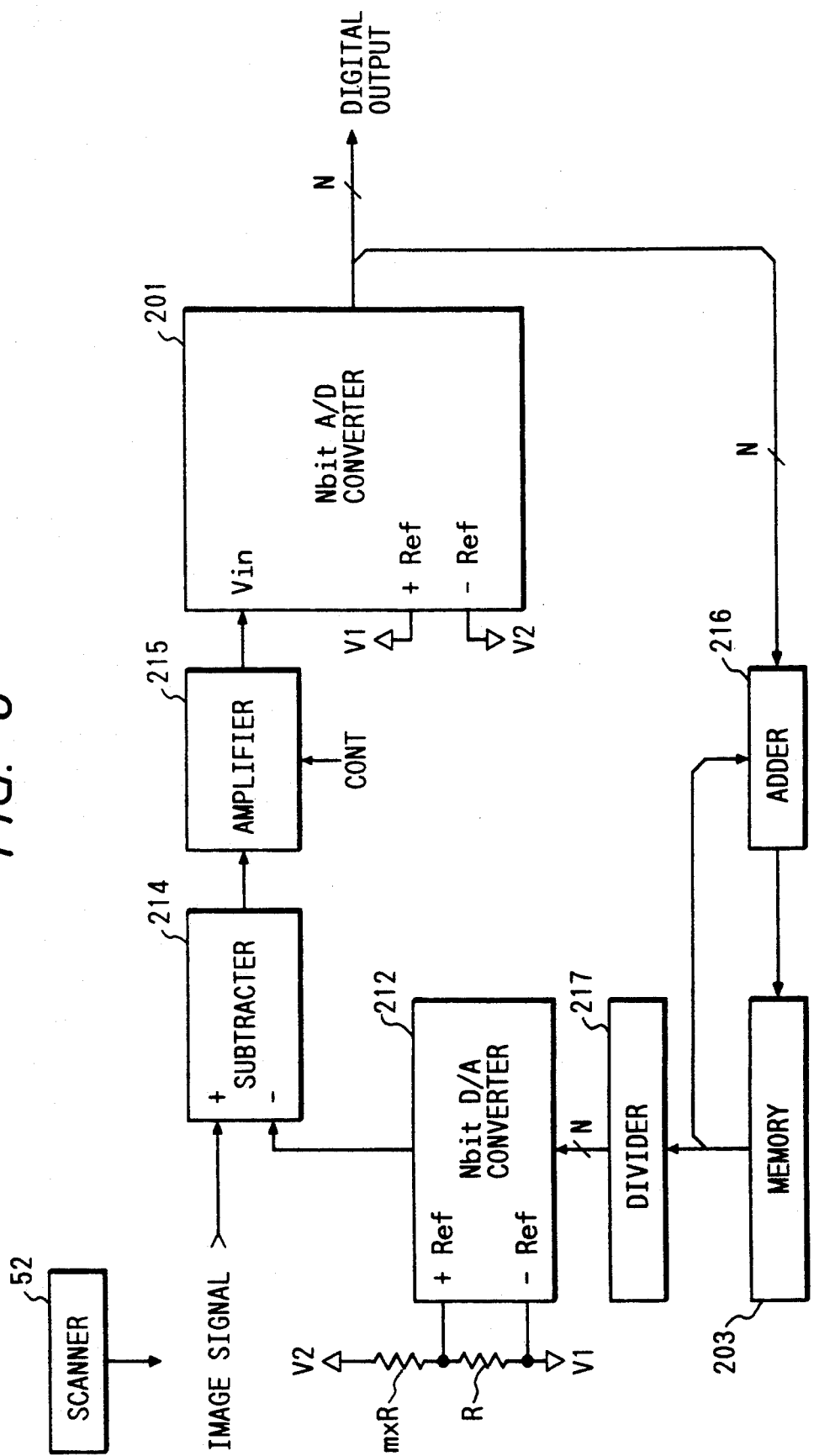
FIG. 8 is a block diagram of a seventh embodiment of the correcting device according to the present invention.

FIG. 8 is a block diagram of a seventh embodiment of the present invention.

The seventh embodiment differs from the sixth embodiment in the method of generating the dark signal correction data. More specifically, in the sixth embodiment, the dark signal data obtained by performing scanning by the scanner 51 once is stored in the memory 203 as the dark signal correction data. However, in this embodiment, scanning by a scanner 52 is performed a plurality of times. In the first scanning operation, the dark signal of each of the pixels of the scanner 52 is written in the memory 203. In the second scanning operation, the output of the memory 203 and the corresponding dark signal of each of the pixels of the scanner are added to each other by an adder 216, and the results of the addition are written in the memory 203. Thereafter, the same operation is repeated a plurality of times, and the contents of the memory 203 are then divided by a divider 217 using as the divisor the number of times the operation is repeated to obtain dark signal correction data.

Since the dark signal correction data of each pixel of the scanner obtained in a plurality of scanning operations are added to each other to obtain an average thereof, it is possible to generate correct dark signal correction data which would be otherwise affected easily by noises because it has a very small level as compared with that of the effective signal. Consequently, influence of the noises is alleviated, and a stable system can be designed readily.

A ½ divider may be provided beyond the adder 216. In that case, the divider 217 can be removed. Furthermore, the number of times addition is made may be set to 2N (=2, 4, 8, 16 . . . ), and the data in the memory may be shifted in an upward direction bit by bit when read from the memory. In that case, the divider 217 can be removed.

In the sixth and seventh embodiments, the image signal correcting device can be formed on a single chip as a semiconductor integrated circuit.

Eighth Embodiment

The size of a memory can be reduced by combining the first to fifth embodiments and the sixth and seventh embodiments. This embodiment utilizes this characteristic. That is, in this embodiment, an external memory is commonly used by both a white signal correcting device and a dark signal correcting device, and these two correcting devices are formed as one unit.

Figure 9:
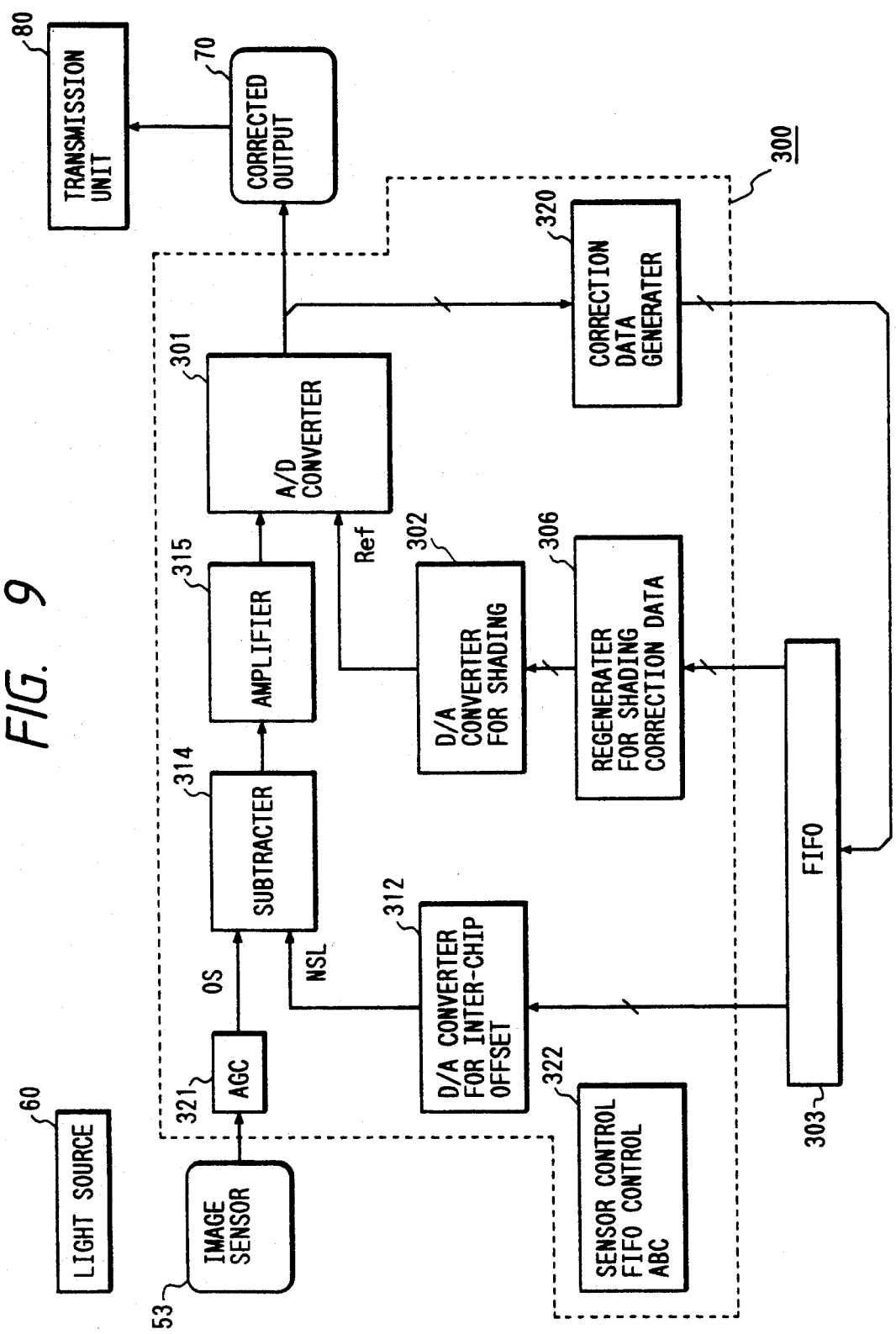
FIG. 9 is a block diagram of an eighth embodiment of the correcting device according to the present invention.

FIG. 9 is a block diagram of an eighth embodiment of an image signal correcting circuit device according to the present invention.

First, a light source 60 is switched off, and the output of an image sensor 53 which scans a dark spot is input to a subtracter 314 through an automatic gain control (AGC) circuit. In that case, correction is not performed by the subtracter 314 and the output of the subtracter 314 is amplified by an amplification factor of 4 by means of an amplifier 315 and then input to a 6-bit A/D converter 301.

A correction data generator 320 generates data to be stored in an 8-bit flip-flop 303 serving as a memory means using the output of the A/D converter 301. The correction data generated is stored in the four leftmost bits of the flip-flop 303.

Next, the light source 60 is switched on, and the signal obtained when the image sensor 53 scans a white reference which is not shown is input to the 6-bit A/D converter 301 through the AGC circuit 321. At that time, the subtracter 314 and the amplifier 315 do not act on the signal. The correction data generator 320 generates correction data from the A/D converted signal, and stores it in the four rightmost bits of the 8-bit flip-flop 303. The correction data generator 320 includes a subtracter and a delay circuit, as in the case of the first through fifth embodiments.

Thereafter, reading of an image of an original is performed. During this operation, a D/A converter 312 decreases the fixed pattern noise data stored in the four leftmost bits of the flip-flop 303 by a factor of 4 and then converts it into an analog signal. The subtracter 314 produces a difference between this signal NS1 and an image signal OS.

A shading correction data regenerator 306 regenerates shading correction data from the data stored in the four rightmost bits of the flip-flop 303, and a D/A converter for shading converts the shading correction data into an analog signal. The resultant analog signal is applied to an A/D converter 301 as a reference voltage. Hence, an output terminal 70 outputs an image signal on which fixed pattern noise correction and shading correction has been conducted.

A control circuit and an ABC circuit 322 controls the image sensor 53 and flip-flop 303. The output image signal is further processed and then transmitted by a transmission means 80.

As stated above, the image signal correcting circuit device according to the eighth embodiment has two correcting circuits, and a common memory. A modification of the eighth embodiment can be formed by combining any of the first to fifth embodiments with either of the sixth and seventh embodiments.

In brief, in the eighth embodiment, the dark signal in the analog image signal from the image reading means is amplified by the amplification factor of m by the amplification means, and the amplified analog dark signal is converted into a digital dark signal by the A/D conversion means. The resultant digital dark signal is stored in the storage means. Also, the analog image signal from the reading means is converted into a digital signal by the A/D conversion means, and the image signal output from the A/D conversion means is delayed by at least one pixel by the delay means. The difference between the image signal delayed by the delay means and a non-delayed image signal from the A/D conversion means is obtained by the subtraction means. The difference data obtained by the subtraction means is stored in the storage means.

Thereafter, the D/A conversion means decreases the digital dark signal read out from the storage means by a factor m and converts it into an analog dark signal. The subtraction means subtracts the analog dark signal from the D/A conversion means from the image signal. These steps are repeated by perform correction of an image signal.

Thereafter, the following steps are repeated. Addition of the difference data from the storage means is performed by the addition means to obtain an original signal from which the difference is obtained by the subtraction means. The image signal from the addition means is converted into an analog signal by the analog conversion means, and the quantizing range of the conversion means is changed in accordance with the analog signal output from the analog conversion means. The image signal is converted into a digital signal by such a conversion means.

An elongated amorphous silicon image sensor disclosed in U.S. Pat. No. 4,461,956 (Hatanaka et al.) can be preferably used as the image sensor 53 used in the present invention, because it has a low cost and a high definition.

Alternatively, an image sensor of the type in which a capacity load is provided in the emitter of a bipolar transistor to voltage read out a signal from the emitter may also be used. Such an image sensor is disclosed in U.S. Pat. Nos. 4,791,469 (Ohmi et al.) and 4,810,896 (Tanaka et al.).

Figure 10:
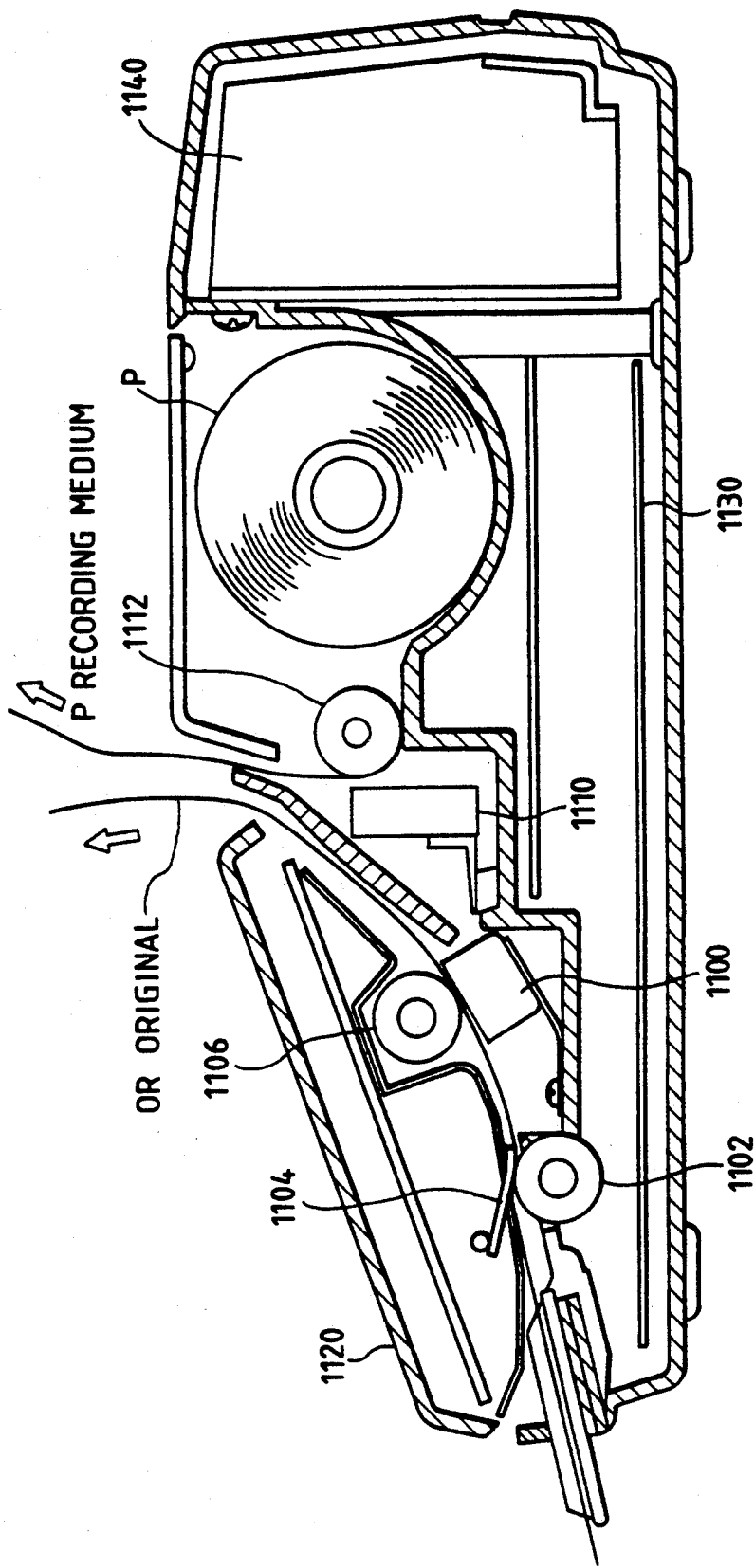
FIG. 10 is a schematic cross-sectional view of an image data processing apparatus according to the present invention.

FIG. 10 shows an example of a facsimile machine with a communication function which is an image data processing device using a sensor unit 1100. An original OR is fed toward the reading position by a paper feed roller 1102 serving as a paper feeding means. The original CR is separated from other originals by a separating member 1104. A platen roller 1106 has a white reference, and is provided at the reading position of the sensor unit to restrict the surface of the original OR to be read and to convey the original OR.

The image signal correcting circuit device according to the present invention may be provided in either of the sensor unit 1100 or a system control substrate 1130.

Image data read by the sensor unit having a light source or transmitted from a remote facsimile machine is reproduced on a recording medium P which is a rolled one in this example. A recording head 1110 forms a recording means for conducting formation of images. The recording head 1110 may be a thermal head or an ink jet recording head. The recording head 1110 may be of a serial or line type. A platen roller 1112 conveys the recording medium P to the recording position of the recording head 1110 and restricts the surface of the recording medium P on which recording is conducted.

Switches serving as input/output means and display portions for displaying messages or states of the apparatus are provided on an operation panel 1120.

On a system control substrate 1130 serving as a control means are provided a controller for conducting various controls, a driver for the photoelectric conversion elements, an image data processors and a transmission portion. Reference numeral 1140 denotes a power source of the apparatus.

Recording means disclosed in U.S. Pat. Nos. 4,723,129 and 4,740,796 are preferably used as the recording means used in the image processing apparatus according to the present invention. In these recording methods, at least one driving signal is applied to an electrothermal energy conversion member disposed in opposed relation to a sheet in which liquid (ink) is held or a liquid passage in response to recording data to rapidly heat the conversion member to a temperature at which nuclear boiling occurs or above and thereby generate thermal energy in the electrothermal energy conversion member. Consequently, nuclear boiling occurs on the heat acting surface of a recording head, and this generates a bubble in the liquid (ink) in one-to-one correspondence to the driving signal. As the bubble grows and contracts, the liquid (ink) is discharged from an opening in the form of at least one droplet.

A full-line type recording head having a length corresponding to the maximum width of the recording medium at which recording can be conducted by the recording device can also be used in the present invention. The full-line type recording head may be either the one comprising a combination of a plurality of recording head, disclosed in the aforementioned patent specifications, or the one which is formed as one unit.

A chip type exchangeable recording head which can be electrically connected to the apparatus body or can be supplied with ink from the apparatus body when mounted on the apparatus body or a cartridge type recording head in which an ink tank is formed integrally with the recording head can also be used in the present invention.

What is claimed is:

1. An image signal correcting circuit device, comprising an A/D conversion means for converting an analog image signal output from an image reading means into a digital signal, a storage means for storing correction data, and a correction means for performing correction on a signal based on the correction data stored in said storage means, wherein said image signal correcting circuit device further comprises a correction data generation means for generating compressed differential data corresponding to a difference between at least two pixel signals in the digital signal, and wherein the compressed differential data is stored in said storage means as the correction data.

2. An image signal correcting circuit device according to claim 1, wherein said correction data generation means further comprises a delay circuit for delaying the digital signal from said A/D conversion means by at least one pixel signal, and a subtractor for obtaining a difference between the delay signal delayed by said delay circuit and the non-delayed signal from said A/D conversion means.

3. An image signal correcting circuit device according to claim 1, wherein said correction means further comprises an adder for performing addition on the correction data stored in said storage means to restore a digital correction signal, and a D/A converter for converting the digital correction signal into an analog correction signal and for inputting the analog correction signal to said a/D conversion means as a reference signal.

4. An image signal correcting circuit device, comprising an A/D conversion means for converting an analog image signal output from an image reading means into a digital signal, a storage means for storing correction data, and a correction means for performing correction on a signal based on the correction data stored in said storage means, wherein said image signal correcting circuit device further comprises an amplification means for amplifying an analog reference signal by an amplification factor of m (m>1), and wherein the amplified analog signal is converted into a digital correction signal by said A/D conversion means, the digital correction signal being stored in said storage means as the correction data.

5. An image signal correcting circuit device according to claim 4, wherein said correction means further comprises a D/A converter for decreasing the correction data stored in said storage means by a factor of m and converting the resultant correction data into an analog correction signal, and a subtracter for subtracting the analog correction signal from said D/A converter from the analog image signal output from said image reading means.

6. An image signal correcting circuit device, comprising an A/D conversion mens for converting an analog image signal output from an image reading means into a digital signal, a storage means for storing correction data, and a correction means for performing correction on a signal based on the correction data stored in said storage means, wherein said correction means further comprises a first correcting circuit for performing correction using first correction data, and a second correcting circuit for performing correction using second correction data, and wherein said first correcting circuit further comprises a correction data generating circuit for generating as the first correction data differential data corresponding to a difference between at least two pixel signals in a digital reference signal and for storing the generated differential data in said storage means, and wherein said second correcting circuit further comprises a circuit for amplifying an analog reference signal by an amplification factor of m (m>1), for converting the amplified analog signal into a digital correction signal by means of said A/D conversion means, and for storing the digital correction signal in said storage means as the second correction data.

7. An image data processing apparatus comprising:
said image signal correcting circuit device set forth in claim 1;
an original holding means for holding an original on which image data is carried at a reading position of an image reading means; and
a recording means for recording the image data read by said image reading means.

8. The image data processing apparatus according to claim 7, wherein said recording means comprises a recording head for performing recording by discharging an ink utilizing thermal energy.

* * * * *

UNITED STATES PATENT AND TRADEMARK OFFICE
CERTIFICATE OF CORRECTION

PATENT NO. : 5,262,873
DATED : November 16, 1993
INVENTOR(S) : KEIJI ISHIZUKA

It is certified that error appears in the above-indentified patent and that said Letters Patent is hereby corrected as shown below:

On The Title Page Item [56]

U.S. Patent Documents, "4,723,129  1/1988  Endo et al."
            should read --4,723,129  2/1988  Endo et al.--.

COLUMN 1

Line 59, "of" should read --or--.

COLUMN 2

Line 1, "with" should read --at--.
Line 2, "at" should read --with--.
Line 6, "economic" should read --economical--.
Line 42, "using" should be deleted.

COLUMN 7

Line 13, "vs+Vn," should read --Vs+Vn,--.
Line 34, "economic" should read --economical--.

COLUMN 9

Line 48, "by" should read --to--.

COLUMN 10

Line 9, "CR" should read --OR--.
Line 60, "head," should read --heads,--.

UNITED STATES PATENT AND TRADEMARK OFFICE
CERTIFICATE OF CORRECTION

PATENT NO. : 5,262,873

DATED : November 16, 1993

INVENTOR(S) : KEIJI ISHIZUKA

It is certified that error appears in the above-indentified patent and that said Letters Patent is hereby corrected as shown below:

COLUMN 11

Line 20, "subtractor" should read --subtracter--.
Line 31, "a/D" should read --A/D--.

COLUMN 12

Line 11, "mens" should read --means--.

Signed and Sealed this

Twenty-seventh Day of September, 1994

Attest:

BRUCE LEHMAN

Attesting Officer    Commissioner of Patents and Trademarks